United States Patent [19]

Auracher et al.

[11] 4,080,244

[45] Mar. 21, 1978

[54] METHOD FOR THE PRODUCTION OF A LIGHT CONDUCTING STRUCTURE WITH INTERLYING ELECTRODES

[75] Inventors: Franz Auracher, Munich; Ralf Kersten, Rottach-Egern, both of Germany

[73] Assignee: Siemens Aktiengesellschaft, Berlin & Munich, Germany

[21] Appl. No.: 783,276

[22] Filed: Mar. 31, 1977

[30] Foreign Application Priority Data

Apr. 6, 1976 Germany .............................. 2614859

[51] Int. Cl.$^2$ .............................................. H01L 7/44
[52] U.S. Cl. .................................... 156/630; 148/188; 156/659
[58] Field of Search ................ 148/1.5, 179, 187, 188; 156/628, 630, 633, 634, 655, 659; 204/192 E; 427/85, 88, 91; 96/36.2, 38.3, 38.4; 29/572, 591; 357/17, 29-31, 19; 250/227

[56] References Cited

U.S. PATENT DOCUMENTS

| 3,629,018 | 12/1971 | Henderson et al. ............. 148/188 X |
| 3,740,280 | 6/1973 | Ronen ............................. 156/645 X |
| 3,856,588 | 12/1974 | Hashimoto et al. ................. 148/188 |
| 3,914,137 | 10/1975 | Huffman et al. ................. 148/188 X |
| 3,994,758 | 11/1976 | Ogawa et al. ..................... 427/89 X |

Primary Examiner—William A. Powell
Assistant Examiner—M. G. Wityshyn
Attorney, Agent, or Firm—Hill, Gross, Simpson, Van Santen, Steadman, Chiara & Simpson

[57] ABSTRACT

A method of producing a light conductor structure having a pair of light conductors embedded in a substrate and electrodes arranged between the light conductors which structure is particularly adapted to be used as an electrically controllable coupler, characterized by providing a substrate, applying a strip of diffusion material on the substrate at the location of each of the light conductors, covering each of the strips of diffusion material with a protective layer of material, applying a metal layer to the substrate and the layer of protective material, removing the protective layer and the metal layer supported thereon, and then diffusing the diffusion material into the substrate by heating to a desired temperature. The embodiments of the method include applying an adhesive layer prior to applying the metal layer to facilitate the attachment of the metal layer on the substrate and applying a dielectric layer prior to applying either the metal layer or the adhesive layer to prevent diffusion of either the adhesive or metal layer into the substrate during the diffusion process.

10 Claims, 7 Drawing Figures

METHOD FOR THE PRODUCTION OF A LIGHT CONDUCTING STRUCTURE WITH INTERLYING ELECTRODES

BACKGROUND OF THE INVENTION

1. Field of the Invention

The present invention is directed to a method for the production of a light conductor structure which has an electrode arranged between the light conductors.

2. Prior Art

Light conducting structures, which have a pair of light conductors with electrodes disposed therebetween, are known. Such structures are used as electrically controllable directional couplers in optical communication technology and act as switches or changeover switches. In addition, such structures are used as electro-optical modulators.

A common feature of these structures is that the two light conductors possess a zone in which they are very closely adjacent to one another. Electrodes are arranged in this zone between the light conductors and also beside each of the light conductors. In this zone a typical value for the spacing between the pair of light conductors is 3μm. This means that the electrodes must be precisely adjusted in their position relative to the conductor and that permissible tolerances are less than 1μm.

A switch, which can be used as the modulator and which comprises two coupled light conductors which can be detuned relative to one another by applying an electrical field to the conductors, is disclosed in an article by H. F. Taylor, "Optical Switching and Modulation in Parallel Dielectric Waveguides," *J. Appl. Phys.*, Vol. 44, No. 7, July 1973, pp. 3257–3262.

If two light conductors are arranged so that they are closely adjacent over a sufficiently long path, they are optically coupled to one another. For example, in a coupling length L, a periodic exchange of optical energy takes place between the two conductors. If both light conductors are loss-free and their phases are matched to one another, the energy exchange is complete. If, however, the propagation constants for the light changes asymmetrically in the light conductors, only a part of the energy is exchanged. Furthermore, there is also a change in the coupling length L over which the maximum energy exchange will occur.

If the light conductors are produced from electro-optical material, it is possible to control the index of refraction and thus the propagation constants in the light conductors by applying an electrical field to the light conductors. The coupling strength, which is dependent upon the distance between the intercoupled light conductors, upon the refractive indices of the conductors, and the coupling length L, is selected to be such that when no electrical field is applied, the energy from one light conductor is coupled in full to the other light conductor. By applying the electrical field to the light conductors, the propagation constants of two light conductors are detuned relative to one another in such a manner that in a given coupling length L, a part of the optical energy is first coupled into the other light conductor and then it is coupled back again.

However, when a central electrode is arranged between the two light conductors, particular difficulties will occur. These difficulties are due to the fact that the distance between the coupled light conductors is only between 1 μm and 3 μm and due to the fact that the central electrode must be positioned as exactly as possible between the light conductors. Thus, tolerances for the position of the electrode are extremely small.

SUMMARY OF THE INVENTION

The present invention is directed to a method of providing a light conductor structure in which electrodes are arranged between the light conductors and adjacent each side. The process eliminates the expenses and problems in obtaining the desired positioning of the electrodes relative to the light conductors.

To accomplish this aim, the process comprises the steps of providing a substrate, applying a strip of diffusion material to the substrate for each of the light conductors at the desired position for the light conductors, covering each of the strips with a protective layer of material, applying a metal layer to the surface of the substrate and the protective layers, removing the protective layer together with a part of the metal layer disposed thereon to expose the strips of diffusion material, and then forming the light conductors by heating the substrate to diffuse the diffusion material into the substrate to produce the embedded light conductor structure.

The method of the present invention can be characterized by the fact that the diffusion material is applied to the substrate in those areas or zones which are later to be occupied by the light conductors, that the diffusion material is covered with a light sensitive protective layer, that the substrate is metallized over its entire area with the strip of diffusion material with its protective layer serving as a mask, that the protective layer is removed along with the matallized layer disposed thereon and that the light conductors are produced by a high temperature diffusion process. Thus, the method advantageously provides an optimum adjustment between the light conductors and the electrodes automatically.

It is also advantageous that the photo mask need only be used for the application of the strip of diffusion material for the light conductors.

DESCRIPTION OF THE PREFERRED EMBODIMENT

Figure 7:
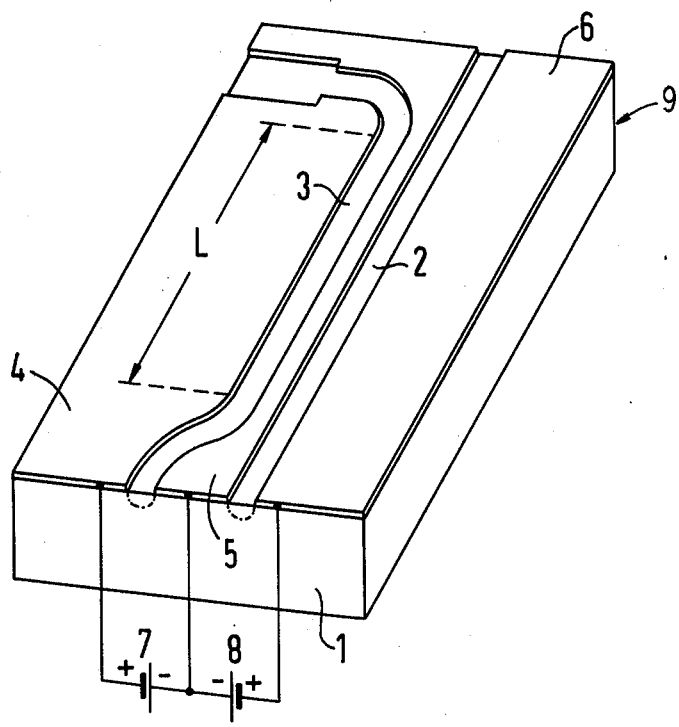
FIG. 7 is a perspective view of a light conductor structure produced in accordance with the present invention.

The principles of the present invention are particularly useful for producing a light conductor structure generally indicated at 9 in FIG. 7.

Figure 1:
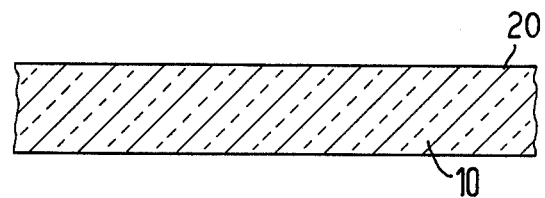
FIGS. 1–6 are partial cross-sectional views illustrating the steps of the method of producing the light conducting structure of the present invention.
Figure 2:
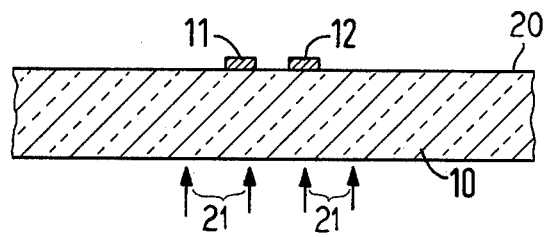

To produce the structure 9, a substrate 10 (FIG. 1), which has a surface 20, is provided. The substrate 10 is in the form of a crystal composed of electro-optical material, for example lithium niobate (LiNbO$_3$) which crystal is cut in such a manner that the crystallographic main axis (c-axis) lies in the plane of the surface 20 and perpendicular to the direction of propagation of light in the later formed light conductors. Instead of using LiNbO$_3$, it is also possible to use a crystal consisting of lithium tantalate (LiTaO$_3$).

After the step of providing the substrate 10, the next step consists in providing strips or paths 11 and 12 of a diffusion material, which is selected from a group consisting of titanium, nickel and niobium, on the surface 20 of the substrate 10. The strips 11 and 12 have the desired shape of the later formed light conductors and are placed in the desired location on the surface 20 for the later formed light conductors. In an exemplary embodiment, the thickness of these strips amounts to approximately 30 nm.

The titanium or niobium strips 11 and 12 can be produced in an arbitrary fashion, for example as follows. The entire surface 20 of the substrate 10 is metallized with either titanium or niobium by a process such as vapor deposition. Then a layer of photo lacquer is applied to the titanium or niobium layer and is exposed to light by means of an appropriate mask so that after development, a photo lacquer remains only in those areas which are to be later occupied by the light conductors. The uncovered titanium or niobium is then removed by a process such as sputter etching, ion beam etching or chemical etching.

Another possible manner of providing the strips 11 and 12 is as follows. The surface 20 of the substrate 10 is provided with a layer of photo lacquer material. This photo lacquer layer is exposed to light by means of appropriate mask so that following development, the photo lacquer layer only remains in those zones or areas of the surface 20 which are not to be occupied by the light conductors. Thus, the area or zones of the surface 20 of the substrate, which areas are to be occupied by the light conductors are exposed. Now the desired diffusion material, such as either titanium and niobium, is applied so that the zones of the substrates which are not covered by the photo lacquer are now covered with the diffusion material. Subsequent to applying the diffusion material, the photo lacquer is removed with a solvent, for example acetone and the diffusion material which was desposited on the photo lacquer material is likewise removed. After removal of the photo lacquer, the substrate 10 has strips 11 and 12 of diffusion material in those areas or zones of the surface 20 on which the subsequent light conductors are to be formed.

Figure 3:
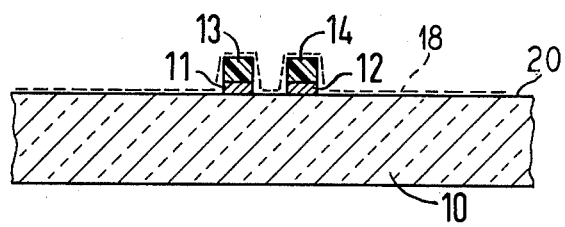

After forming or providing the strips 11 and 12 on the surface 20 of the substrate 10, the next step in the method is applying photoresist layers 13 and 14 (FIG. 3) on the strips 11 and 12, respectively. The application of the photoresist layer can be accomplished in the following manner. A layer of positive acting photo resist, for example Shipley AZ 1350, is applied to cover the surface 20 of the substrate 10 and the strips 11 and 12 of diffusion material. This photoresist or photo lacquer layer is exposed by projecting the light through the substrate 10 (as indicated by arrows 21) so that the strips 11 and 12 of diffusion material serve as a mask. Since a positively acting photo lacquer layer was used, the exposed zones of the photo lacquer layer will be dissolved during the development of the photo lacquer layer so that only the unexposed portions will remain. Due to the exposure through the substrate and due to using the strips 11 and 12 as a mask, only portions 13 and 14 which cover the strips 11 and 12 will remain after the development of the photo lacquer layer.

After applying the protective layers 13 and 14 on the strips 11 and 12, the surface of the substrate having the strips 11 and 12 is provided with a metal layer 16 which material will subsequently be utilized as electrodes in the finished structure. A suitable metal for the layer 16 is selected from a group consisting of gold and platinum or nickel-chromium or titanium-gold alloys and the layer 16 can be, for example, applied by vapor deposition.

In order to improve the adhesive strength of the metal layer 16 on the substrate, it is expedient to provide an additional adhesive layer 15 directly to the surface 20 of the substrate 10 and then to apply the metal layer 16 on the adhesive layer 15. The adhesive layer is a material selected from a group consisting of titanium, chromium, nickel-chrome compounds and nickel-chrome alloys.

Figure 4:
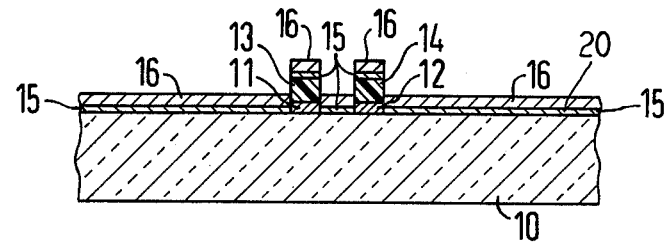

In an exemplary embodiment, the thickness of the adhesive layer is between 5 nm and 10 nm and the thickness of the metal layer 16 is approximately 300 nm. As illustrated in FIG. 4, the thickness of the metal layer 16, and the adhesive layers 15 are very slight or small in comparison to the thickness of the protective layers 13 and 14 of photo lacquer. For example, the photo lacquer has the thickness of approximately 0.6 $\mu$m to 1 $\mu$m.

Figure 5:
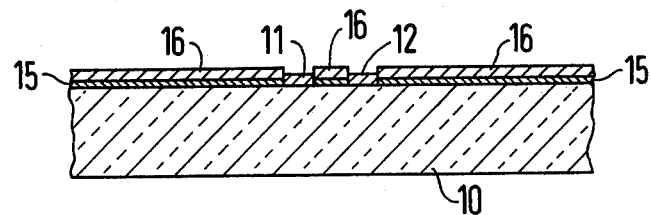

After applying the adhesive layer 15 and metal layer 16 (FIG. 4), the protective layers 13 and 14 are removed such as by dissolving the photo lacquer with a solvent which may consist of, for example acetone. Under the effect of the solvent, the photo lacquer will begin to swell to facilitate removal of the adhesive layer 15 and metal layer 16 that were applied thereon. After the initial swelling, the photo lacquer of the protective layers 13 and 14 will become detached from the strips 11 and 12 to produce a structure, which is illustrated in FIG. 5 and has the surface 20 of the substrate 10 having the strips 11 and 12 with their mating edges in contact with a composite layer 15 and 16 which cover the remaining areas of the surface 20. The remaining portion of the composite layers 15 and 16 will subsequently form the electrodes in the final light conductor structure 9.

Figure 6:
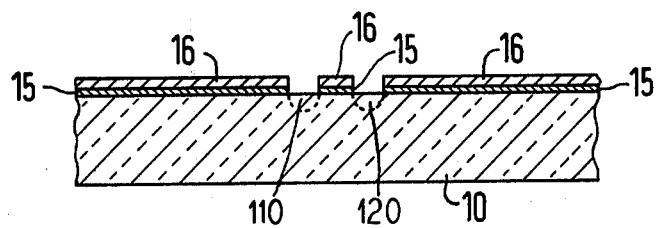

In order to form the light conductors, a diffusion process is carried out in which the diffusion material of the strips 11 and 12 will diffuse into the substrate 10. The diffusion of the diffusion material into the substrate will increase the index of refractin of the substrate material so that the light conductors are formed at that point or area. To accomplish this diffusion process, the substrate is heated for approximately 3 hours to approximately 950° C. Due to the diffusion of the material of the strips 11 and 12, light conductors 110 and 120 (FIG. 6) will be formed as the strips of diffusion material 11 and 12 disappear by being diffused into the substrate 10.

With the final step of diffusing the strips 11 and 12 into the substrate 10 to form the light conductors 110 and 120, the structure generally indicated at 9 in FIG. 7 is formed. It will be noted that the method of producing the structure 9 did not require any expensive alignment steps and in particular the electrodes are automatically aligned in the desired position relative to the light conductors such as 110 and 120.

As best illustrated in FIG. 7, the finished stucture or device 9, which may serve as a modulator includes a substrate 1 which consists of the electro-optical crystal, for example lithium niobate (LiNbO$_3$). By the diffusion of the diffusion materials, such as either titanium and nickel or niobium, the index of refraction of the substrate 1 underlying the strips 11 and 12 is increased to produce the two light conductors 2 and 3 which are arranged closely adjacent one another over a coupling length L. The structure or device 9 has an electrode 5 between the light conductors 2 and 3 and electrodes 4 and 6 which are beside the conductors 3 and 2, respectively. By connecting each of the electrodes 4, 5 and 6 to a desired voltage source such as 7 and 8, it is possible to modify the optical properties of the light conductors 2 and 3.

During the process of diffusing the diffusion materials of the strips 11 and 12 into the substrate 10 to form the conductors such as 110 and 120, either the material of the adhesive layer 15, if present, or in the absence of the adhesive layer 15, the metal of the layer 16 will also diffuse into the substrate 10. This effect is advantageous and thus the light conductors which are formed in the substrate are so-called slab coupled waveguides in which the most highly doped zones of the light conductors 110 and 120 (FIG. 6) extend the greatest distance of depth into the substrate. In this way, a good coupling between adjacent light conductors 2 and 3 is achieved which enables the distance between the two light conductors to be relatively great.

However, slab coupled waveguides are not satisfactory for conducting light through a sharp curve having a small radius of curvature, and, therefore, slab coupled waveguides are not suitable for use as waveguides having curves or bends with a small radius of curvature. In those applications in which the light conductors are to have sharp curves or bends which are of a small radius of curvature, it is therefore expendient to provide a dielectric layer 18 (shown in broken lines in FIG. 3) on the surface 20 of the substrate 10 before applying the electrode layer which comprises either the metal layer 16 alone or with the adhesive layer 15. The dielectric layer consists of glass that has a high melting point of $SiO_2$ or $SiN_4$ etc and can be produced or provided, for example by vapor deposition or sputtering. The dielectric layer 18 will prevent diffusion of the materials of either the adhesive layer 15 and/or the metal layer 16 and, therefore, prevents the formation of the slab coupled waveguides so that the light conductors may have many curves and may have curves with a small radius of curvature.

Although various minor modifications may be suggested by those versed in the art, it should be understood that we wish to employ within the scope of the patent warrented hereon, all such modifications as reasonably and properly come within the scope of our contribution to the art.

We claim:

1. A method of forming a light conductor structure having a pair of light conductors embedded in a substrate and an electrode arranged between the light conductors, said structure being particularly adapted for use as an electrically controllable coupler, said method comprising the steps of providing a substrate, applying a strip of diffusion material for each light conductor on the substrate in the location for each of the light conductors which are to be formed, covering each of the strips of diffusion material with a photoresist layer, covering the entire surface of the substrate and each of the two protective strips with a metal layer, removing the protective photoresist layers with the metal layer disposed thereon to expose the strips of diffusion material and subsequently forming the light conductors by heating the substrate to a temperature to diffuse the diffusion material into the substrate to form the light conductors.

2. A method according to claim 1, which further includes applying a dielectric layer to the substrate prior to applying the metal layer so that the dielectric layer prevents diffusion of the metal layer during the step of heating to diffuse the diffusion material into the substrate.

3. A method according to the claim 1, which includes applying an adhesive layer to the substrate prior to the step of applying the metal layer so that the adhesive layer improves the adhesion of the metal layer to the substrate.

4. A method according to claim 3, which includes applying a dielectric layer to the substrate prior to applying the adhesive layer so that the dielectric layer prevents diffusion of the adhesive layer into the substrate during the step of heating.

5. A method according to claim 4, wherein the adhesive layer consists of a material selected from a group consisting of titanium, chromium, niobium, molybdenum, nickel-chrome compounds and nickel-chrome alloys.

6. A method according to claim 1, wherein the substrate consists of an electro-optical material.

7. A method according to claim 6, wherein the electro-optical material of the substrate is selected from a group consisting of lithium niobate and lithium tantalate.

8. A method according to claim 1, wherein the metal layer is a metal selected from a group consisting of gold and platinum.

9. A method according to claim 1, wherein the diffusion material is selected from a group consisting of titanium, nickel and niobium.

10. A method according to claim 1, wherein the step of applying the protective photoresist layer consists of applying a positive acting photo lacquer on the entire surface of the substrate, exposing the photo lacquer or photoresist by projecting light through the substrate with the strips of the diffusion material acting as a mask, and then developing the photo lacquer so that the exposed lacquer component becomes detached from the substrate.

* * * * *